United States Patent [19]

Kon

[11] Patent Number: 4,686,130
[45] Date of Patent: Aug. 11, 1987

[54] TRIM COVER ASSEMBLY FOR VEHICLE SEATS

[75] Inventor: Shigeki Kon, Akishima, Japan

[73] Assignee: Tachikawa Spring Co., Ltd., Tokyo, Japan

[21] Appl. No.: 841,100

[22] Filed: Mar. 18, 1986

[30] Foreign Application Priority Data

Mar. 30, 1985 [JP] Japan ................................. 60-67651

[51] Int. Cl.⁴ ......................... A47C 7/02; B32B 31/00
[52] U.S. Cl. .................................. 428/71; 156/275.1; 156/289; 156/290; 156/308.4; 297/DIG. 1; 428/158; 428/167; 428/317.5
[58] Field of Search ................... 156/289, 290, 275.1, 156/272.2, 308.4, 309.3; 428/158, 167, 316.6, 317.1, 317.5, 71; 297/DIG. 1

[56] References Cited

U.S. PATENT DOCUMENTS

| 3,687,766 | 8/1972 | Reinkemeyer | 156/275.1 |
| 4,078,959 | 3/1978 | Palfey | 156/289 |
| 4,534,595 | 8/1985 | Abe | 297/DIG. 1 |

Primary Examiner—Michael Wityshyn
Assistant Examiner—J. Davis
Attorney, Agent, or Firm—Cushman, Darby & Cushman

[57] ABSTRACT

A trim cover assembly for a seat used in a vehicle such as an automobile is disclosed which is a combination of a top cover member, a foam wadding and a wadding cover welded together by means of high frequency waves and also which is formed with a plurality of stitches by means of such high frequency waves on the top surface thereof for the improved appearance thereof. In the portions of the welder stitches where the trim cover assembly is curvedly placed, there is provided a non-welded portion, making the trim cover assembly easy to curve in such portions as well as preventing the production of wrinkles.

6 Claims, 6 Drawing Figures

TRIM COVER ASSEMBLY FOR VEHICLE SEATS

BACKGROUND OF THE INVENTION

1. Field of the Invention

The present invention relates to a trim cover assembly for seats used in vehicles such as an automobile and the like, and, more particularly, to an improved trim cover assembly which is formed by laminating a top cover member, a wadding and a wadding cover on one another and then welding these three components together by means of high-frequency waves into a united body and is formed on the top surface thereof with a plurality of recessed-groove-like welder stitches, and which is capable of covering a curved cushion member, as well as a method of manufacturing the same.

2. Description of the Prior Art

Conventionally, there is known the above-mentioned type of trim cover assembly for vehicle seats, which is formed by placing a top cover member (1), a wadding (2) and a wadding cover (3) on one another in this order and then high-frequency welding the three components into a united body and is formed on the top surface thereof with a plurality of recessed-groove-like welder stitches (4) and also which is then placed to cover cover a cushion member (7), in particular, a curved surface of a curved portion (6) thereof, (see FIGS. 1 and 2).

By the way, due to its heat curing during welding, the above-mentioned welder stitch is not suitable for a curving operation, is easily broken when it is forcibly curved, and may give rise to wrinkles (5). Therefore, the welder stitch has been rarely formed in the curved portion (6).

As a countermeasure to avoid the above-mentioned problems, there is known a method in which a reinforcing member is welded to the back surface of the curved portion. However, this method involves complicated manufacturing steps and is found to have no effect in preventing the production of the wrinkles.

SUMMARY OF THE INVENTION

The present invention aims at eliminating the drawbacks found in the prior art trim cover assembly for vehicle seats.

Accordingly, it is an object of the invention to provide to provide an improved trim cover assembly for vehicle seats in which welder stitches are protected against breakage and no wrinkles are produced in the curved portion of a cushion member.

In attaining this object, according to the invention, in welder stitches formed in the portions of the present trim cover assembly covering the curved portions of a curved cushion member, there is provided a non-welded portion which extends in a direction intersecting perpendicularly to the direction of the welder stitches, that is, longitudinally of the curved portions of the curved cushion member between a wadding and a wadding cover, or between the wadding and a top cover member.

Therefore, the portions of the trim cover assembly covering the curved portions of the cushion member, between the wadding and wadding cover or between the wadding and top cover member, are not integrally welded due to the provision of the non-welded portion, whereby such portions of the trim cover assembly are easy to bend and also no wrinkles are produced in such portions.

It is another object of the invention to provide a method of manufacturing the above-mentioned trim cover assembly.

To this end, according to the invention, there is provided a method in which a top cover member, a wadding and a wadding cover are sequentially placed onto a welder mold having a plurality of projecting strips for welding thereon, a strip-like insulation member is interposed between the wadding and wadding cover or between the wadding and top cover member for preventing such two members being welded to each other in a manner that the insulation member extends in a direction instersecting perpendicularly to the longitudinal direction of the above-mentioned projecting strips, the above-mentioned top cover member, wadding and wadding are high-frequency welded together into an integral body using the welder mold, a plurality of welder stitches are formed on the top surface of the integral body, thereafter the insulation member is removed to produce a non-welded portion between the wadding and wadding cover or between the wadding and top cover member.

Therefore, according the method of the invention, the non-welded portion can be formed simply by interposing the insulation member between the wadding and wadding cover or between the top member and wadding and thus a conventional manufacturing apparatus can be used to manufacture a trim cover assembly, which permits the simple and mass production of the trim cover assembly.

The above and other related objects and features of the invention will be apparent from a reading of the following detailed description of the preferred embodiments taken in connection with the accompanying drawings and the novelty thereof pointed out in the appended claims.

DETAILED DESCRIPTION OF PREFERRED EMBODIMENTS OF THE INVENTION

Figure 1:
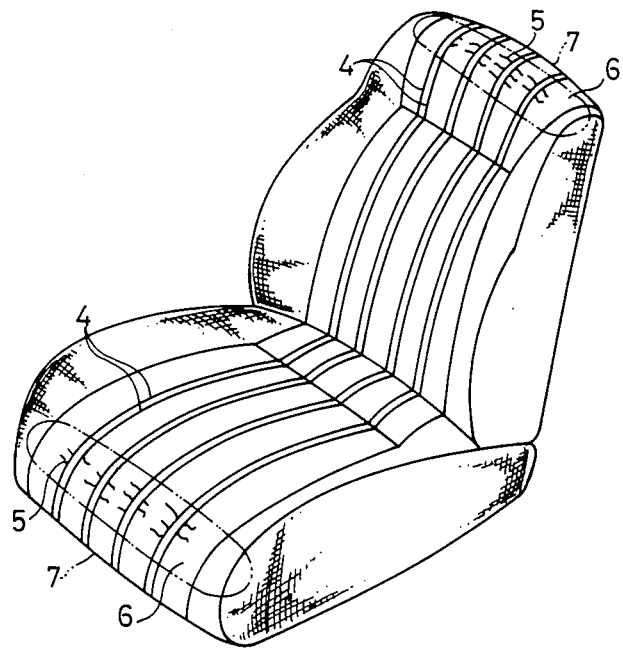
FIG. 1 is a perspective view of a conventional trim cover assembly, illustrating a state in which it is used in a vehicle seat.
Figure 2:
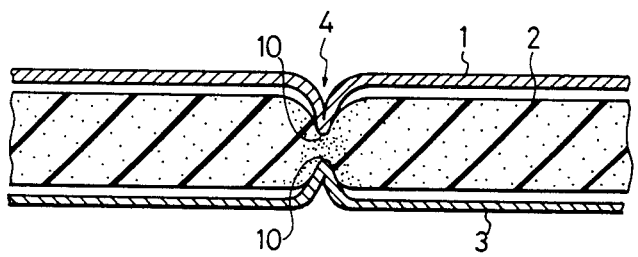
FIG. 2 is a section view of the above conventional trim cover assembly.
Figure 3:
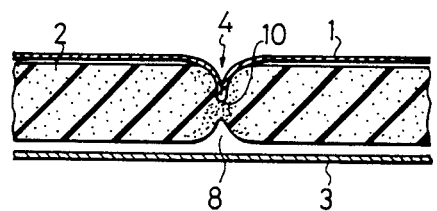
FIG. 3 is a section view of an embodiment according to the invention.
Figure 4:
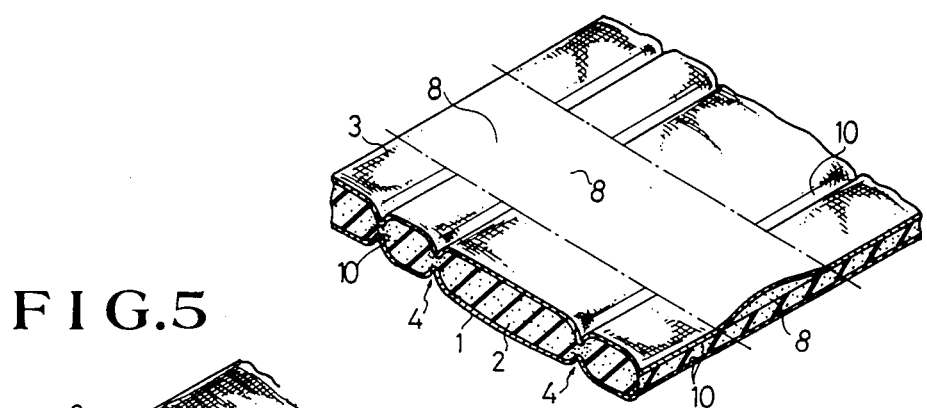
FIG. 4 is a partially cutaway perspective view of the above embodiment of the invention.

Referring first to FIGS. 3 and 4, there is illustrated a trim cover assembly manufactured in accordance with the invention. The illustrated trim cover assembly, which is a combined body of a top cover member (1), a wadding formed of foam material and a wadding cover placed sequentially on one another and is formed with a plurality of recessed-groove-like welder stitches (4) on the top surface of the top cover member (1), is provided, in the portion thereof covering the curved portion of a curved cushion member (7) which is mold formed of foam material in in the same shape as with a vehicle seat, with a non-welded portion (8) which exists between the wadding (2) and wadding cover (3) and extends in a direction intersecting perpendicularly to the direction of the welder stitches (4).

It should be noted here that in FIG. 4 the above-mentioned components of the present trim cover assembly are positioned upside down against their actual positions in use for the purpose of illustration.

The above embodiment of the invention is easy to curve since the wadding (2) and wadding cover (3) are not welded to be separated from each other. Also, when the present trim cover assembly is curved, the welder stitches (4) thereof are difficult to break, and at the same time no distortion is forcibly created so that no wrinkles will be produced. Accordingly, the embodiment of the invention is suitable for covering the curved portion of the cushion member.

Figure 5:
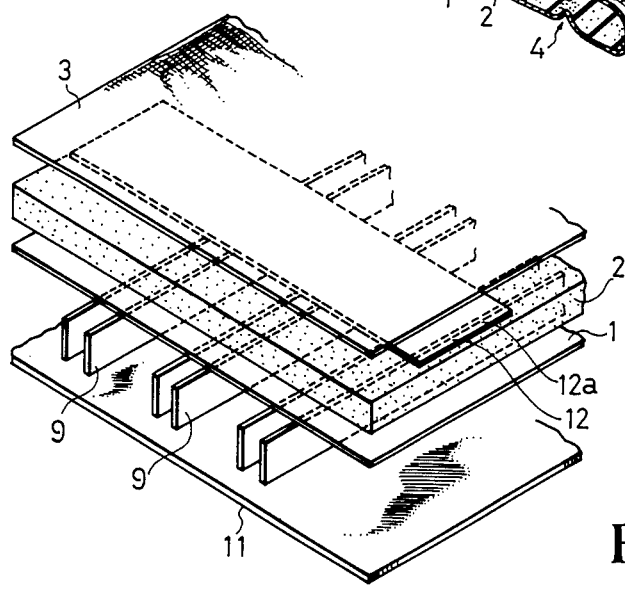
FIG. 5 is an explanatory view illustrating a method of manufacturing a trim cover assembly according to the invention; and, FIG. 6 is a section view of another embodiment of the invention.

Next, we will describe a method of manufacturing a trim cover assembly in accordance with the invention in connection with FIG. 5.

In the present method, a top cover member (1), a wadding (2) and a wadding cover (3) are sequentially put on one another onto a welder mold (11) having a plurality of projecting strips for welding (9), a strip-shaped insulation member (12) is interposed between the wadding (2) and wadding cover (3) in a manner to extend in a direction intersecting perpendicularly to the longitudinal direction of the above-mentioned projecting strips (9), the top cover member (1), wadding (2) and wadding cover (3) are high-frequency welded by the welder mold (11) into a united body, a plurality of welder stitches (4) are formed on the top surface of the top cover member (1), and thereafter the insulation member (12) comprising an insulation paper (12a) is removed.

In this case, for the purpose of operation, the components piled up on one another are positioned upside down as against their normal conditions in use.

Also, since the insulation paper (12a) is interposed prior to welding of the above-mentioned three components, such welding can be carried out only in the required portions thereof except the portions thereof where the strip-like insulation paper (12a) is inserted, whereby the non-welded portion (8) is formed in the portion where the insulation paper (12a) is inserted.

Figure 6:
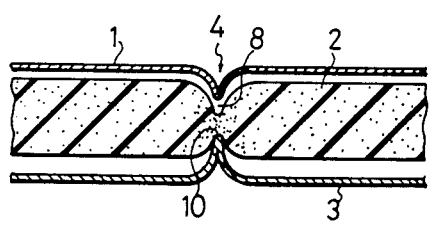

Referring now to FIG. 6, there is shown another embodiment of the invention in which the non-welded portion (8) is formed between the top cover member (1) and wadding (2), while in the above-described first embodiment of the invention the strip-like insulation member (12) is interposed between the wadding (2) and wadding cover (3) and the non-welded portion (8) is formed therebetween. In other words, to manufacture this embodiment, the top cover member (1), wadding (2) and wadding cover (3) are placed on one another, the strip-shaped insulation member (12) is interposed between the top cover member (1) and wadding (2), and thereafter these components are heated by means of high frequency waves using the welder mold, so that the above-mentioned three components are welded together and a plurality of welder stitches (4) are formed on the top surface of the top cover member (1). In this manufacturing operation, in the above-mentioned strip-like insulation member insertion portion, the wadding (2) of foam material is welded and hardened and the wadding cover (3) is weleded to the wadding (2) in a welded portion (10), while the non-welded portion (8) is produced between the top cover member (1) and wadding (2).

A method of manufacturing the second embodiment is similar to the above-mentioned method of making the first embodiment of the invention, except that the strip-like insulation member (12) is interposed between the top cover member (1) and wadding (2). Therefore, further description about the method is omitted here.

As has been described hereinbefore, according to the invention, there is provided a partial, non-welded portion extending in a direction intersecting perpendicularly to welder stitches formed in the portion of the present trim cover assembly for covering the curved portion of a cushion member and existing between a wadding and a wadding cover or between the wadding and a top cover member, whereby in the portion of the present trim cover assembly covering the curved portion of the cushion member, the wadding and wadding cover are not welded to each other or the wadding and top cover member are not welded to each other. Therefore, the non-welded portion is easy to curve, prevents the welder stitches against breakage, and produces no wrinkles. That is, the present invention can provide a trim cover assembly which is improved in aesthetic appearance than the conventional trim cover assemblies.

Also, since the above-mentioned non-welded portion is formed by inserting the insulation paper, the present invention is easy to manufacture, which permits a mass production system.

What is claimed is:

1. A trim cover assembly for a vehicle seat comprising a lamination of a top cover member, a wadding of foam material and a wadding cover, said lamination being welded by means of high frequency waves so as to form a plurality of longitudinal welds with recessed-groove-like welder stitches on a top surface thereof, said trim cover being adapted to cover a curved cushion member, wherein the portion of each of said welds of said trim cover assembly adapted to cover the curved portion of the cushion member includes at least one non-welded portion extending in a direction perpendicularly to the longitudinal direction of said welds; said non-welded portions being between at least one of said wadding and said wadding cover and said wadding and said top cover member.

2. The trim cover assembly for a vehicle seat as set forth in claim 1, wherein said non-welded portions are between said wadding and said top cover member.

3. The trim cover assembly for a vehicle seat as set forth in claim 1, wherein said welder stiches are formed on a top surface of said top cover member disposed above said non-welded portion.

4. A method of manufacturing a trim cover assembly provided with a non-welded portion, comprising the steps of:
   sequentially placing a top cover member, a wadding, and a wadding cover onto a welder mold having a plurality of projecting strips for welding thereon;
   interposing a strip-shaped insulation member between at least one of said wadding and said wadding cover and said wadding and said top cover member; said insulation member extending in a direction perpendicular to the longitudinal direction of said projecting strips;
   high-frequency welding said top cover member, wadding and wadding cover into an integral body so as to form a plurality of welds with welder stitches on a top surface of said top cover member; and removing said insulation member to form said non-welded portion between at least one of said wadding and said wadding cover and said wadding and said top cover member.

5. A method according to claim 4, wherein said strip-shaped insulation member is interposed between said top cover member and said wadding, to thereby produce said non-welded portion between said top cover member and said wadding.

6. The method according to claim 4, wherein said strip-shaped insulation member is disposed between said wadding cover and said wadding, to thereby produce said non-welded portion between said wadding cover and said wadding.

* * * * *